United States Patent [19]

Bondi

[11] 3,977,088
[45] Aug. 31, 1976

[54] VERTICAL POSITIONING DEVICE

[76] Inventor: Herman H. Bondi, 1224 SE. Henry, Portland, Oreg. 97202

[22] Filed: Mar. 24, 1975

[21] Appl. No.: 561,196

Related U.S. Application Data

[62] Division of Ser. No. 293,390, Sept. 29, 1972, Pat. No. 3,879,852.

[52] U.S. Cl. ............................. 33/334; 33/180 R; 33/393; 227/156
[51] Int. Cl.² ..................... B25C 7/00; B25B 29/00
[58] Field of Search .................. 33/180 R, 189, 332, 33/333, 334, 354, 370, 392, 393; 227/2, 5, 110, 156

[56] References Cited
UNITED STATES PATENTS

| | | | |
|---|---|---|---|
| 1,080,448 | 12/1913 | Honey | 33/354 |
| 2,245,646 | 6/1941 | Bullivant | 33/333 |
| 2,545,321 | 3/1951 | Tumminello | 33/354 |
| 3,162,957 | 12/1964 | O'Connell et al. | 33/189 |
| 3,310,215 | 3/1967 | Bostick | 227/156 |
| 3,715,808 | 2/1973 | Petrik | 33/392 |
| 3,805,472 | 4/1974 | Helderman | 33/392 |

*Primary Examiner*—Richard E. Aegerter
*Assistant Examiner*—Richard R. Stearns
*Attorney, Agent, or Firm*—Chernoff & Vilhauer

[57] ABSTRACT

A device adapted for use in the building construction industry for shooting a stud or other fastener into a ceiling in predetermined relation to a known point on a floor below. The device comprises an adjustable telescopic pole with a hanger arm extending laterally from its top. A plumb line, having a plumb bob attached to its lower end, hangs from the outer end of the hanger arm for alignment of the stud gun with the point on the floor and the muzzle of the stud gun may be mounted in direct or offset alignment with the plumb line to facilitate rapid and accurate positioning of the stud gun. Means are provided for vertically aligning the telescopic pole such that the muzzle of the stud gun is in vertical alignment with the plumb line.

7 Claims, 5 Drawing Figures

U.S. Patent    Aug. 31, 1976    3,977,088
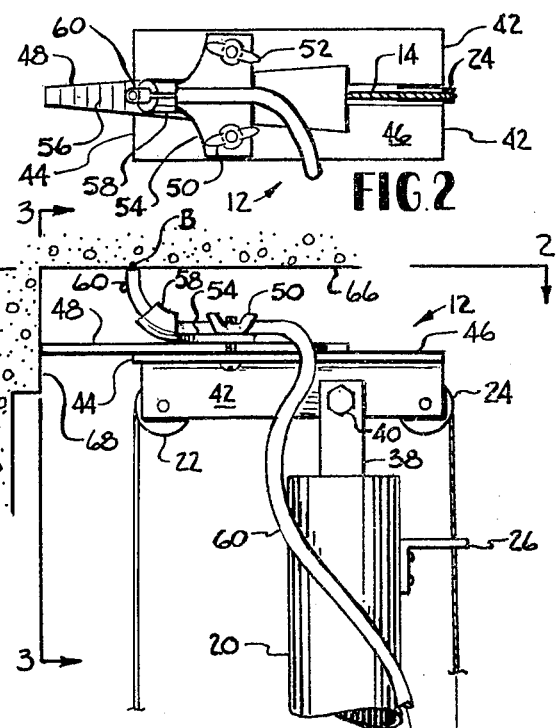
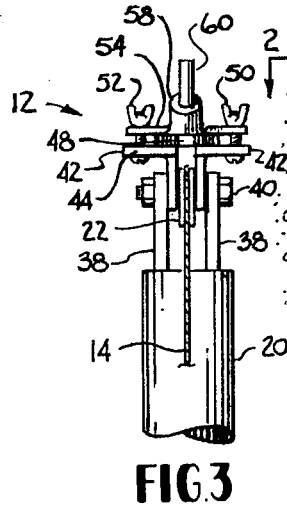
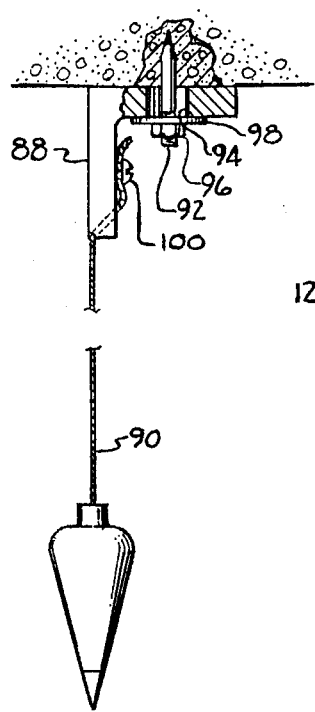
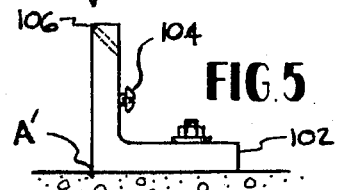
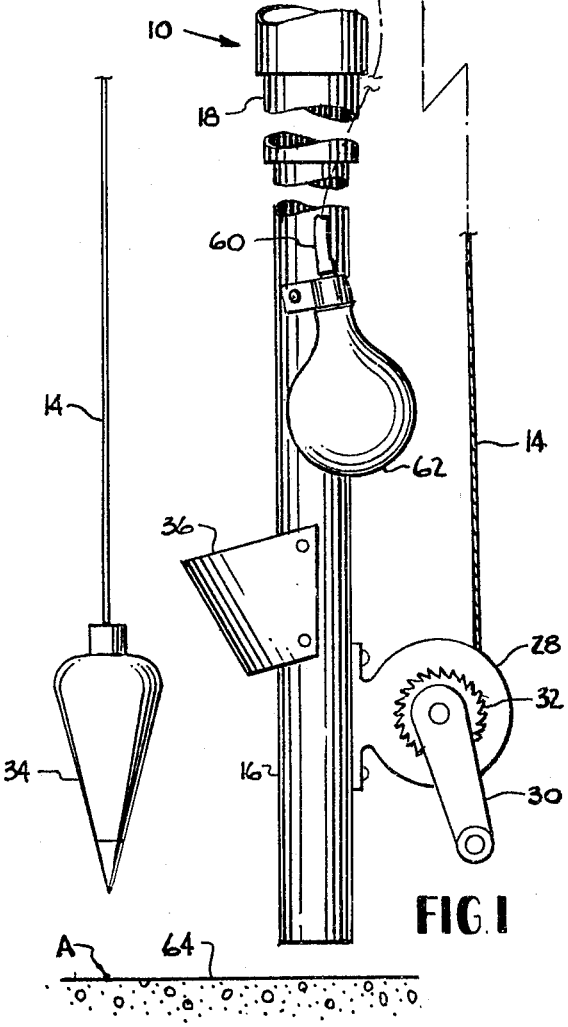

VERTICAL POSITIONING DEVICE

This application is a division of my co-pending application Ser. No. 293,390, filed Sept. 29, 1972, now U.S. Pat. No. 3,879,852.

BACKGROUND OF THE INVENTION

This invention relates to improvements in method and apparatus for positioning a point at one elevation in predetermined relation to a known point at a different elevation. More particularly the invention is intended to be utilized primarily in the building construction industry as an aid in properly positioning and aligning electrical fixtures, heating and air conditioning outlets, structural frameworks, walls, decorative moldings, etc. The invention can be used to provide direct vertical alignment of points or offset relationships of predetermined magnitude.

In vertical positioning devices of the type known to the art and shown for example in Martinez U.S. Pat. No. 3,407,509 and O'Connell et al U.S. Pat. No. 3,162,957, means are provided for locating a point on a ceiling vertically above a known point on the floor. The utility of such devices is severely limited, however, by their lack of capability for performing the reverse function, i.e. locating a point on the floor in relation to some known overhead point. In addition such devices are unable to relate to vertical surfaces, such as that of a ledge of molding, or of providing offsets of predetermined variable magnitude between upper and lower points.

In order to accomplish any of these latter functions, all of which are commonly required in construction work, two or three workmen are normally needed, one standing on a ladder and holding a plumb line at a desired overhead location while a second man on the floor monitors the position of the plumb bob. A third man holding the ladder for the first workman is also usually required. Each such separate procedure for positioning a desired point in relation to a known point or vertical surface is quite time consuming, and the great number of such procedures required for any particular construction job, coupled with the fact that two or three men must take part in each procedure, adds markedly to the required man hours and resultant cost of the job.

Accordingly a great need exists in the building and construction industry for a more versatile device and method for positioning points at one elevation in aligned or offset vertical relation with known points or vertical faces at a different elevation, particularly where the known points are located at overhead elevations, such apparatus and method being such that points may be positioned swiftly and accurately by one man working alone from a location on the ground or floor.

SUMMARY OF THE PRESENT INVENTION

The present invention is directed to a positioning device and method of the general type described which is considerably more efficient and versatile than those devices and methods presently known to the art. The device comprises an extensible, elevating support member, preferably a telescopic pole, from the top of which is suspended a plumb line indicator having a plumb bob attached to its lower end. The top of the pole mounts a locator portion having positioning means by which the upper end of the plumb line can be either aligned with or adjustably offset from an identifiable overhead point or surface, for example a point on a ceiling or a vertical ledge face or molding surface. In addition, the locator portion also preferably carries an upwardly facing marking means aligned with, or offset from, the plumb line. Preferably the marking means comprises the upper end of a long flexible tube which extends downwardly along the telescopic pole and has a squeezable bulb attached at its lower end. Both the bulb and tube are filled with a marking chalk which may be selectively applied to mark points by squeezing the bulb. An alternative embodiment of the invention features a percussion type stud gun mounted atop the telescopic pole with the barrel of the gun positioned vertically in either aligned or offset relation with the plumb line.

The fact that the locator portion of the device includes means by which a workman standing on the floor may accurately position the top of the plumb line either aligned with or offset from a known elevated point or surface permits one man, working without the help of others and without the aid of ladders or other elevating equipment, to quickly and accurately mark points on the floor in line with the tip of the plumb bob in desired relation to the known overhead points or surfaces. Alternatively, if the workman is required to position elevated points in relation to known points on the floor, he may do so with equal facility by positioning the tip of the plumb bob over the known point on the floor and placing a chalk mark on the ceiling. In addition, the fact that the locator portion of the device includes adjustable means by which the top of the plumb line may be offset a variable predetermined distance from overhead points or surfaces lends an added degree of versatility to the device by permitting the mechanical establishment of a desired offset relationship between upper and lower points.

If the workman wishes to place studs of other fasteners into the ceiling in predetermined relation to known points on the floor, he may use a similar device with a stud gun mounted atop. The fact that the pole is telescopic, thereby permitting the muzzle of the stud gun to be brought into abutment with ceilings of various heights, enables the stud gun to function properly and greatly minimizes any tendency of the device toward inaccuracy.

A variation of the technique previously described for positioning upper and lower points in vertical alignment with one another involves a method for stretching a taut plumb line from a predetermined point on the floor to a vertically aligned point on the ceiling, so that such plumb line may be utilized during construction as a guide for aligning structural members. The essence of the method is that an upper bracket, from which a temporary plumb line depends, is loosely attached to the ceiling in a position approximately aligned with a predetermined point on the floor by shooting a stud into the ceiling through an oversized opening in the bracket. The oversized opening permits the position of the bracket thereafter to be finely adjusted into precise vertical relationship with the point on the floor, after which the bracket is tightened into place, the temporary plumb line is removed and a taut plumb wire is stretched between the upper bracket and a lower bracket installed in proper position on the floor.

It will be recognized from the foregoing summary that a principal objective of the present invention is to provide a versatile device and method, useful primarily in building construction, for enabling one man, working alone from a location on the ground or floor, to position points at lower elevations in predetermined relation to known points at overhead elevations, as well as permitting him to perform the reverse function with equal facility when required.

It is a further objective of the present invention to provide means by which one workman may efficiently position a point at one elevation in predetermined relation to an existing vertical face or surface at a different elevation.

It is a further objective of the present invention to provide a device of the general type described having adjustable positioning means by which a variable predetermined offset relationship between upper and lower points may be established.

It is a still further objective of the present invention to provide a means and method for quickly and accurately stretching a taut plumb line between floor and ceiling to be utilized as a guide during construction.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is an extended side view of the vertical positioning device of the present invention.

FIG. 2 is a top view of the head portion of the device taken along lines 2—2 of FIG. 1.

FIG. 3 is an end view taken along lines 3—3 of FIG. 1.

FIG. 4 is a partial extended side view of an alternative embodiment of the device having a stud gun mounted at its top.

FIG. 5 is a partially sectional, extended side view of apparatus used in stretching a taut plumb wire according to the method of the present invention.

DETAILED DESCRIPTION OF THE INVENTION

The vertical positioning device of the present invention comprises an extensible, elevating support member, designated generally as 10 in FIG. 1, with a locator portion 12 mounted atop the support member and a plumb line indicator 14 depending from the locator portion 12. In the preferred embodiment of the invention, the support member 10 preferably comprises a telescopic pole having multiple sections such as 16, 18 and 20 respectively, each slideably carried within the next higher section so that the pole may be adjusted to any desired length within a reasonably wide range thereby enabling the device to be used to relate to points or surfaces at varying elevations. The telescopic pole sections 16, 18 and 20 may be adjustably extended or collapsed with respect to one another and then locked in position by any convenient means, such as by means of detents or eccentric inner surfaces which tighten when the sections are twisted with respect to one another. These locking details are not shown inasmuch as they are conventional and form no part of the invention.

Because the height of the device is adjustably variable, it is desirable to provide means by which the plumb line indicator 14 may be shortened or lengthened according to the length adjustment of the telescopic pole 10. To permit this adjustment, the locator portion 12 from which the plumb line 14 depends is equipped with a pair of pulleys 22 and 24 respectively, through which an extension of the plumb line 14 is trained. From pulley 24, the extension of line 14 extends downwardly through a guide bracket 26 to a reel assembly 28. The reel assembly comprises a crank 30 by which the line 14 may be controllably let out or taken in, and a ratchet mechanism 32 which locks the reel 28 in place after the length of line required for a particular positioning procedure has been released. A conventional plumb bob 34 is attached to the end of the pendent portion of line 14, and a pocket 36 is provided on the pole 10 for holding the plumb bob 34 when the device is not in use.

The locator portion 12 comprises a horizontal hanger arm 42 rigidly and detachably mounted on the top of the telescopic pole 10 through a bracket and bolt assembly 38, 40. The detachable feature enables replacement mechanisms to be attached to the top of the pole 10 when different functions are required, as will be further explained hereafter. The aforementioned pulleys 22 and 24 are rotatably mounted at either end of the hanger arm 42, the pulley 22 from which hangs the pendent portion of the plumb line 14 being extended outwardly from the pole 10 a sufficient distance that the plumb bob 34 will hang freely without interference with the pole when the pole is held approximately vertical.

The end face 44 of the hanger arm 42, located immediately above pulley 22, is positioned so as to be in vertical perpendicular alignment with the pendent plumb line 14. Resting on the top face 46 of the arm 42 is an adjustable sliding member 48 which may be selectively fixed in a predetermined position or, alternatively, allowed to slide inwardly or outwardly with respect to the end face 44, depending upon whether the thumb screws 50, 52 which engage a securing bracket 54 are tightened or loosened. The sliding member 48 includes graduated scale indicia 56 on its upper surface which enable a workman to extend the member 48 a measured distance beyond the end face 44 of hanger arm 42, and thereafter to fix the sliding member in a preselected position by tightening the thumb screws for purposes to be explained hereafter.

The securing bracket 54 includes a retainer 58, mounted adjacent its outer end, proximate to but not extending beyond the end face 44 of hanger arm 42. The purpose of the retainer 58 is to mount the formed upper end of a resilient flexible tube 60 in a position whereby the end will face directly upwardly in vertical alignment with the pendent plumb line 14. From the retainer 58 the flexible tube travels downwardly along telescopic pole 10 and terminates in a squeezable bulb 62 mounted adjacent the lower end of the pole. A sufficient amount of slack in the length of the tube 60 is provided so as not to interfere with the extension of the pole 10.

In operation, the vertical positioning device of the present invention may be utilized to perform a variety of functions. Assume for example that a point "A" must be positioned on the floor 64 in vertical alignment with a known point "B" located on the ceiling 66. A workman standing on the floor may quickly determine the position of the desired point A by extending the telescopic tube 10 (while simultaneously releasing a corresponding length of line 14) until the upper end of the tube 60 is aligned with the point B on the ceiling. Since the upper end of tube 60 is aligned with the top of the pendent plumb line 14, a point marked on the floor in alignment with the bottom tip of plumb bob 34 will be the desired point A.

Alternatively, assumed that it is desired to locate a point A on the floor in vertical alignment with an elevated vertical face, such as the face 68 of a protruding ledge or molding. In such case the adjustable slide member 48 is completely withdrawn and the end face 44 of the hanger arm 42, which is also aligned with the top of the pendent plumb line 14, is brought into abutment with the face 68. (If necessary, the formed upper end of the resilient tube 60 will bend inwardly slightly to permit such abutment.) Thereafter a point marked on the floor in alignment with the tip of the plumb bob 34 will be the desired point.

As a further alternative, assume that it is required that the point A be positioned, not in alignment with the face 68, but rather offset horizontally a predetermined distance from the face. In this case the sliding member 48 is extended the predetermined measured distance beyond the end face 44 using the scale 56 as a guide and locked in position by means of thumb screws 50 and 52. Thereafter the outer end of sliding member 48 is brought into abutment with the face 68 as shown in FIG. 1, and the desired point A is marked on the floor in alignment with the tip of the plumb bob 34. A predetermined horizontal offset of point A with respect to a known point B on the ceiling may similarly be obtained by aligning the outer end of sliding member 48 with the known point B and marking the desired point A as before.

The reverse procedure of those previously described, i.e. positioning a point B on the ceiling 66 in predetermined relation to a known point A at a lower elevation, can also be performed with the device of FIG. 1. Assume for example that a workman is required to position a point B on the ceiling in vertical alignment with a known point A on the floor. The workman extends the telescopic pole 10 and lets out the plumb line 14 as before until the upper end of the tube 60 is in close proximity witht the ceiling. The workman then adjusts the position of the pole until the tip of the plumb bob 34 is aligned with the known point A. In this position the upper end of the tube 60 will be aligned with the desired point B. The tube 60 and its associated squeezable bulb 62 are filled with a marking chalk, and the workman simply squeezes the bulb 62 slightly to deposit a quantity of chalk onto the ceiling at the desired position.

As will be readily apparent to those skilled in the art having the benefit of the foregoing disclosure, it would also be possible to position a point B on the ceiling in a predetermined offset relation from a known point A on the floor if the device were modified slightly so that the retainer member 58 which holds the upper end of the tube 60 were mounted on the outer end of the sliding member 48 rather than on the securing bracket 54. Provided a sufficient amount of slack is provided in the tube 60, the upper end of the tube could then selectively either be withdrawn into direct alignment with the top of the plumb line 14 or, alternatively, extnded a predetermined offset distance beyond the plumb line 14 in the same manner previously described for extending and withdrawing the sliding member 48.

FIG. 4 illustrates a version of the vertical positioning device having a modified head portion 12a which may be installed by removing bolt 40 and replacing the original locator portion 12. The unique feature of the head portion 12a is that it includes a mounting frame 70 attached atop its hanger arm portion 42a. The mounting frame 70 is adaptable to hold a conventional type stud gun 72 in an upwardly facing position so that its muzzle 74 may be aligned with the pendent plumb line 14. The muzzle 74 may alternatively be adjusted in a preselected offset position from the top of plumb line 14 by means of appropriate adjustable fastener means, such as a pair of thumb screws 76 which pass through a pair of slots 78 and attach mounting frame 70 to the hanger arm 42a. A conventional scale (not shown), similar to scale 56 in the previous embodiment, indicating the relation between the muzzle 74 of the gun and the top of the plumb line 14 is preferably provided so that the muzzle 74 may be selectively aligned with or offset a measured distance from the plumb line by loosening the thumb screws 76, sliding the frame 70 laterally with respect to hanger arm 42a, and retightening the thumb screws.

The purpose of the modified embodiment shown in FIG. 4 is to permit a workman quickly and easily to affix a stud or other fastener to the ceiling in predetermined relation to a known point at a lower elevation. The procedure is the same as that previously described for marking a point on the ceiling in relation to a known point A, except that once the pole 10 is positioned with the plumb bob suspended directly above the known point on the floor, the workman pulls downwardly on a trigger line 80 which is attached at its upper end to the trigger 82 of the stud gun by a clip 84. Assuming that the telescopic pole 10 has been raised sufficiently to place the muzzle of the stud gun in close proximity with the ceiling, a fastener will be driven by the percussive force of the gun into the ceiling in the desired location. Because, in the embodiment of FIG. 4, the muzzle of the stud gun is located at some distance above the top of the plumb line 14, any skewing of the pole 10 might result in some inaccuracy. To prevent the possibility of such skewing, and depending upon the degree of accuracy required, it may be desirable to utilize a plumb pin such as 86 attached near the bottom of the pole 10 by which the pole may be positioned parallel with the plumb line 14 to prevent the possibility of skewing.

It will be appreciated by those skilled in the art that a significant benefit of the vertical positioning device of the present invention in carrying out each of the above described locating procedures is that each of procedures can be performed by one man working alone from a position on the floor or ground. The aid of a second workman at an overhead elevation to position the upper end of the plumb line is not required due to the elevating pole 10 and locator structure 12.

In the course of normal building construction it becomes necessary in many instances to stretch a taut plumb wire from a predetermined point on the floor to a vertically aligned point on the ceiling, so that such plumb line may be utilized during construction as a guide for aligning various structural members. FIG. 5 depicts a simple and highly efficient method for locating and fastening the upper end of such a plumb wire and stretching it to the floor. A workman elevated by a ladder or platform locates an upper bracket 88, from which depends a temporary plumb line 90, in a position approximately aligned with a lower known point A'. Then, utilizing a conventional percussion type stud gun, he drives a stud 92 into the ceiling through an oversized aperture 94 in the bracket 88 while such bracket is so positioned. After threading a nut and washer 96, 98 onto the end of the stud 92 so that the bracket 88 is loosely held against the ceiling, the workman finely adjusts the position of the bracket, as permitted by the enlarged size of aperture 94, until the tip of the plumb bob suspended from the temporary plumb line 90 is precisely aligned with the point A'. Thereafter the nut 96 is tightened, and the temporary plumb line 90 is removed by loosening screw 100 and replaced with a plumb wire. A lower bracket 102 is fastened to the floor in precise alignment with the point A', which presents no particular problem, and the lower end of the plumb wire is passed through the aligned aperture 106 of the bracket 102 and attached tautly to the bracket by means of fastening screw 104. The taut plumb wire may then be used as a precise guide for positioning certain structural elements as construction of the building progresses. The essential advantage of the method is the facility and precision with which the upper end of the plumb wire may be fastened properly in place.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for attaching a fastener to an overhead surface in predetermined vertical relation to a known point at a lower elevation, said device comprising:
    a. an elongate support member;
    b. a hand-held type stud gun having a hand grip and a finger-actuated trigger for shooting a fastener into said overhead surface;
    c. head means mounted atop said support member, said head means comprising hanger means for supporting a plumb line at a position laterally outward from said support member, and frame means for detachably mounting said hand-held type stud gun in an upwardly-facing direction so as to permit the muzzle of said gun to be elevated by said support member into proximity with said overhead surface; and
    d. a plumb line mounted on said head means to depend from said hanger means for positioning the muzzle of said gun in predetermined vertical relation with said known point at said lower elevation, said plumb being vertically alignable with the muzzle of said gun.

2. The device of claim 1 including means extending from the trigger of said gun downwardly along said support member for pulling said trigger when said gun is held at an overhead elevation.

3. The device of claim 1 wherein said support member includes extensible means for elevating said gun into proximity with overhead surfaces at different heights.

4. The device of claim 3 wherein means are provided on said device for selectively lengthening or shortening said plumb line to correspond with the extension or retraction of said extensible means.

5. The device of claim 4 wherein said hanger means includes pulley means for supporting said plumb line, and said means for selectively lengthening or shortening said plumb line comprises a reel mounted on said support member, adjacent the end thereof opposite the end to which said head means is mounted, for letting out or taking in a selected length of said plumb line which runs from said reel upwardly along said support means and over said pulley means.

6. A device for attaching a fastener to an overhead surface in predetermined vertical relation to a known point at a lower elevation, said device comprising:
    a. a support member;
    b. a hand-held type stud having a trigger for shooting a fastener into said overhead surface;
    c. frame means atop said support member for mounting said hand-held type stud gun in an upwardly-facing direction so as to permit the muzzle of said gun to be elevated by said support member into proximity with said overhead surface;
    d. a weighted plumb line attached to said support member in a position so as to be alignable with the muzzle of said gun for positioning said muzzle of said gun in predetermined vertical relation with said known point at said lower elevation; and
    e. means for aligning the support member such that said muzzle of said gun is in vertical alignment with said plumb line so as to avoid skewing of said gun.

7. A device for attaching a fastener to an overhead surface in predetermined vertical relation to a known point at a lower elevation, said device comprising:
    a. a support member;
    b. a hand-held type stud gun having a trigger for shooting a fastener into said overhead surface;
    c. frame means mounted atop said support member for mounting said hand-held type stud gun in an upwardly-facing direction so as to permit the muzzle of said gun to be elevated by said support member into proximity with said overhead surface;
    d. plumb indicator means mounted on said support member for positioning the muzzle of said gun in predetermined vertical relation with said known point at said lower elevation; and
    e. adjustable means for permitting the muzzle of said gun to be positioned in variable predetermined lateral offset relation with respect to said support means.

* * * * *

UNITED STATES PATENT AND TRADEMARK OFFICE
CERTIFICATE OF CORRECTION

PATENT NO. : 3,977,088
DATED : August 31, 1976
INVENTOR(S) : Herman H. Bondi

It is certified that error appears in the above-identified patent and that said Letters Patent are hereby corrected as shown below:

| | | |
|---|---|---|
| Col. 1, | Line 29 | Change "ledge of" to --ledge or--. |
| Col. 5, | Line 40 | Change "witht" to --with--; |
| | Line 60 | Change "extnded" to --extended--. |
| Col. 8, | Line 22 | After "stud" add the word --gun--; |
| | Line 24 | After "means" add the word --mounted--. |

Signed and Sealed this

Thirtieth Day of November 1976

[SEAL]

Attest:

RUTH C. MASON
Attesting Officer

C. MARSHALL DANN
Commissioner of Patents and Trademarks